US007782914B2

(12) United States Patent
Faure et al.

(10) Patent No.: US 7,782,914 B2
(45) Date of Patent: Aug. 24, 2010

(54) DEVICE AND METHOD FOR HIGH-ENERGY PARTICLE PULSE GENERATION

(75) Inventors: Jérôme Faure, Cachan (FR); Jean Philippe Rousseau, Meudon la Foret (FR); Victor Malka, Paris (FR); Jean-Paul Chambaret, Chatillon (FR); Frédéric Burgy, Paris (FR)

(73) Assignees: Centre National De La Recherche Scientifique (CNRS), Paris (FR); Ecole Nationale Superieure De Techniques Avancees, Paris (FR); Ecole Polytechnique, Palaiseau (FR)

( * ) Notice: Subject to any disclaimer, the term of this patent is extended or adjusted under 35 U.S.C. 154(b) by 0 days.

(21) Appl. No.: 11/632,428

(22) PCT Filed: Jul. 13, 2005

(86) PCT No.: PCT/IB2005/002620

§ 371 (c)(1),
(2), (4) Date: Jan. 11, 2007

(87) PCT Pub. No.: WO2006/008655

PCT Pub. Date: Jan. 26, 2006

(65) Prior Publication Data

US 2007/0242705 A1 Oct. 18, 2007

(30) Foreign Application Priority Data

Jul. 16, 2004 (EP) ................................. 04291820

(51) Int. Cl.
*H01S 3/10* (2006.01)
*H01S 3/09* (2006.01)

(52) U.S. Cl. ............................. 372/25; 372/73; 372/74

(58) Field of Classification Search ..................... 372/5, 372/25, 73, 74
See application file for complete search history.

(56) References Cited

U.S. PATENT DOCUMENTS 5,050,183 A * 9/1991 Duling, III .................. 372/94

(Continued)

OTHER PUBLICATIONS

"Production and characterization of intensities above 2×1019 W/cm2, obtained with 30-TW 300-fs pulses generated in a Ti:sapphire/ND-doped mixed-glass chain" by C. Rouyer et al.; *J. Opt. Soc. Am. B*; XP-002304871; vol. 13, No. 1; Jan. 1996; pp. 55-58.

(Continued)

*Primary Examiner*—Minsun Harvey
*Assistant Examiner*—Patrick Stafford
(74) *Attorney, Agent, or Firm*—Blakely, Sokoloff, Taylor & Zafman LLP

(57) ABSTRACT

A device for generating a high-energy particle pulse is provided which comprises a laser system producing laser pulses with pulse length shorter than 100 fs (femtoseconds), and capable to be focused to peak intensities greater than 10A18 W/cmA2, preferred greater than 10A20 W/cmA2 (watts per centimeter squared), a device for shaping the temporal intensity profile accompanying said at least one laser pulse for increasing the laser contrast above 10^5, preferably above IL 0A7, especially 1OA10, and a target capable of releasing a high-energy particle pulse, particularly an electron or a proton pulse, upon irradiation with at least one of said laser pulses. A. corresponding method using the device is also described.

11 Claims, 7 Drawing Sheets

U.S. PATENT DOCUMENTS

Figure 1:
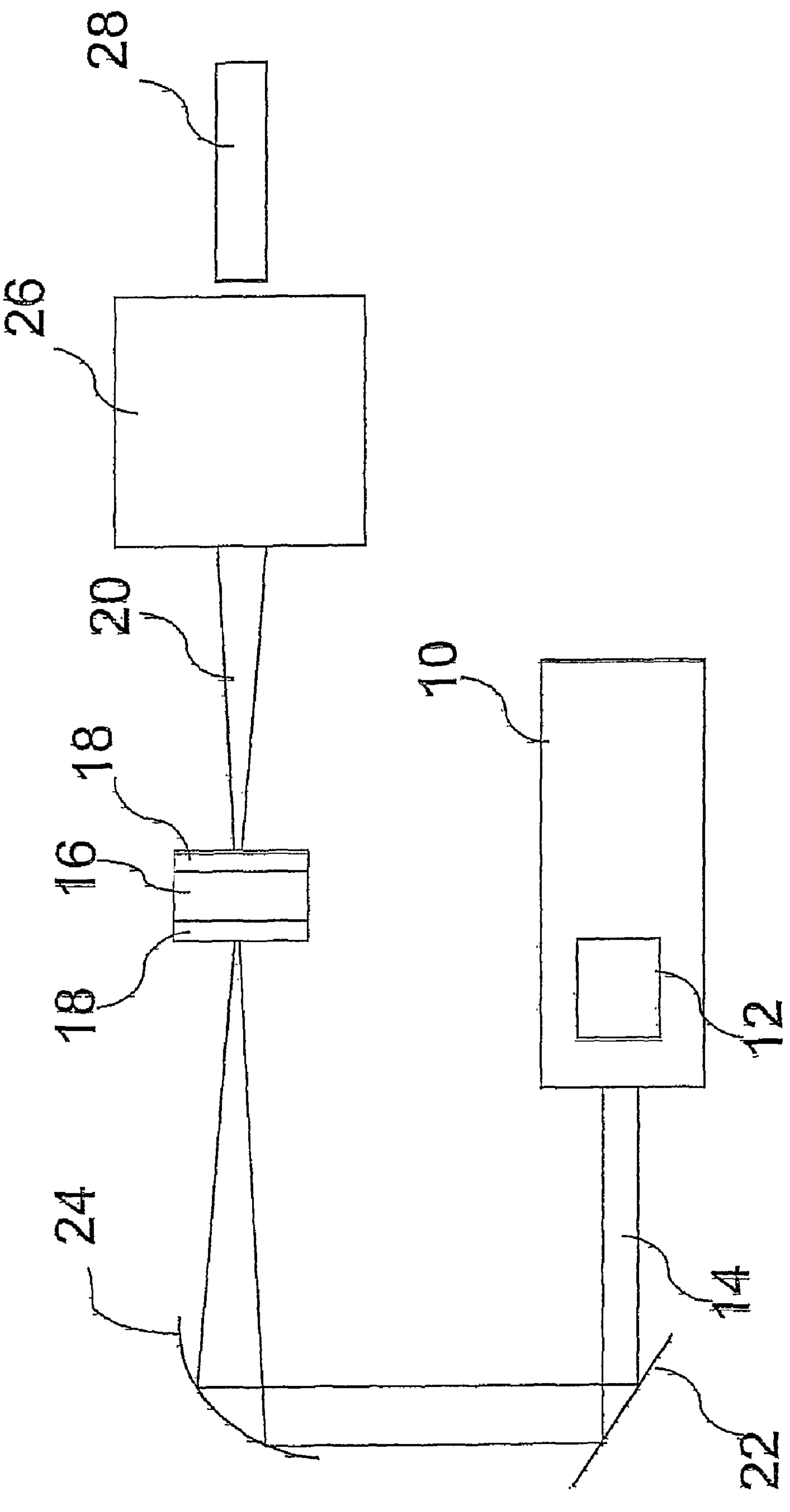

| | | | | |
|---|---|---|---|---|
| 5,221,988 | A * | 6/1993 | Juhasz | 359/247 |
| 5,335,258 | A | 8/1994 | Whitlock | |
| 5,541,947 | A * | 7/1996 | Mourou et al. | 372/25 |
| 2002/0172235 | A1 * | 11/2002 | Chang et al. | 372/5 |
| 2002/0172317 | A1 | 11/2002 | Maksimchuk et al. | |
| 2004/0018700 | A1 * | 1/2004 | Cowan et al. | 438/513 |
| 2004/0233944 | A1 * | 11/2004 | Dantus et al. | 372/25 |

OTHER PUBLICATIONS

"Complete characterization of a plasma mirror for the productin of high-contrast ultraintense laser pulses" by G. Doumy, et al.; *Physical Review E 69*, 026402; Feb. 2004; XP-002304872; vol. 69, No. 2; pp. 69026402-1-026402-12.

"Amplitude Modulation of a kilowatt laser pulse with LiNbO3 Pockels cells Experiments and results on Phebus facility" by Emmanuel Bar, et al.; XP-002304870; *SPIE* vol. 3492; pp. 957-963; 1999.

"A mode-locked fibre laser using a Sagnac interferometer and non-linear polarization rotation" by B Ibarra-Escamilla, et al.; *Journal of Optics A: Pure and Applied Optics*; Sep. 2003; vol. 5, No. 5; pp. S225-S230.

"High-efficiency frequency doubling of ultrahigh-intensity Nd:glass laser pulses" by C.Y. Chien, et al.; *Summaries of Papers Presented at the Conference on Lasers and Electro-Optics*; vol. 8; 1994; XP008038465.

"Optoelectronic feedback in a Sagnac fiber-optic modulator" by A. Garcia-Weidner, et al.; *Proceedings of SPIE* vol. 4419; 2001; XP-002304873; pp. 350-353.

* cited by examiner

DEVICE AND METHOD FOR HIGH-ENERGY PARTICLE PULSE GENERATION

This is a non-provisional application claiming the benefit of International application No. PCT/IB2005/002620 filed Jul. 13, 2005.

The invention relates generally to a device and a method for generating a high-energy particle pulse, with a laser system producing laser pulses with pulse length shorter than 100 fs (femtoseconds) and capable to be focused to peak intensities greater than 10^18 W/cm^2 (watts per centimeter squared), and a target capable of releasing a high-energy particle pulse upon irradiation with at least one of said laser pulses.

By focusing an ultra-intense and ultra-short laser pulse onto a surface of a thin target, it is possible to generate a very strong electrical field, more than a few hundred GV/m (giga-volt per meter), capable to accelerate particles, e. g. electrons or ions, from the target to high energies and into a collimated and pulsed beam on a very short length scale in comparison to conventional particle accelerators, such as cyclotrons or the like. Basically, in response to the impinging powerful laser pulse, electrons are accelerated to relativistic energies and ejected from the target due to thermal expansion and/or a ponderomotive electron expulsion. The ion acceleration then is caused by the very strong electrostatic field which is created due to charge separation in or immediately after this generation of high-energy electrons. Notably accelerated protons were observed. These particles originate for instance from impurities absorbed on the front and/or back surfaces of the target or from proton-rich outer layers of a multi-layered target.

The interest in these compact particle accelerators has grown in recent years especially in view of medical and/or radiological applications. On the one hand, accelerated electrons or light ions, such as protons or carbon ions, are frequently used in radiotherapy directly for cancer treatment by exposing the cancer tissue to the particle flux. On the other hand, highly energetic particles can induce electromagnetic interactions or nuclear reactions. They can therefore be used to create photons of short wavelength, e. g. UV or x-rays, or to generate radioisotopes which can serve for imaging in nuclear medicine, medical diagnostics or radiology.

In document US 2002/0172317 A1 a method and an apparatus for generating high-energy particles and for inducing nuclear reactions are disclosed. The apparatus comprises a laser for emitting a laser beam of high-intensity with an ultra-short pulse duration and an irradiation target for receiving the laser beam and producing high-energy particles in a collimated beam. The collimated beam of high-energy particles might be collided onto a secondary target containing nuclei, thereby inducing a nuclear reaction in the secondary target. The entire disclosure of document US 2002/0172317 A1 is incorporated by reference into this specification.

In general, the energy of the accelerated particles is increasing with increasing laser light intensity. However, it has turned out that the energy yield of the accelerated particles is restricted. This is due to the time-dependent intensity structure in the laser pulse: The main laser pulse is accompanied by a pedestal intensity, in other words, by a precursor intensity on the raising edge of the pulse and a successor intensity on the falling edge of the pulse. This pedestal intensity, often essentially constant or slowly varying with respect to the main laser pulse, is basically created by amplification of spontaneous emitted photons in the laser system (amplified spontaneous emission, ASE). It can also convey additional intensity spikes, glitches, or side-lobes (for instance pre-pulses). While the main laser pulse is shorter than 1 ps, the pedestal intensity can last several orders of magnitude longer and even reach the ns (nanosecond) time scale. When the peak intensity of the interacting laser pulses is increased beyond a certain limit, the pedestal intensity may be sufficiently powerful to ionise the target and to create a substantial pre-plasma (being an under-dense plasma) before the peak intensity in the main pulse arrives at the target. Typically ionisation starts at 10^10 to 10^11 W/cm^2 and becomes significant at about 10^13 to 10^14 W/cm^2. In this situation the interaction takes place in the undesired regime of an under-dense plasma with different physical reactions degrading or spoiling the acceleration of particles to high energies.

The technical problem to solve is to decrease the influence of or to avoid the generation of a pre-plasma at the target irradiated by ultra-intense and ultra-short laser pulses.

This problem is solved by a device with the limitations according to claim 1 and/or by a method with the limitations according to claim 9. Further improvements and advantageous embodiments and refinements are defined by the limitations set out in the dependent claims.

According to the invention a device for generating a high-energy particle pulse is provided which comprises a laser system producing laser pulses with pulse length shorter than 1 ps (picosecond), preferred shorter than 100 fs (femtoseconds), and capable to be focused to peak intensities greater than 10^18 W/cm^2, preferred greater than 10^20 W/cm^2 (watts per centimeter squared), a device for shaping the temporal intensity profile accompanying (e.g. immediately preceding and/or succeeding, or travelling with, or deforming the side wings of, and/or of) said at least one laser pulse for increasing the laser contrast above 10^5, preferably above 10^7, especially 10^10, and a target capable of releasing a high-energy particle pulse, particularly an electron or a proton pulse, upon irradiation with at least one of said laser pulses. The laser contrast is the ratio of peak intensity to the pedestal intensity of the laser pulse. In other words the device includes an element which affects, especially can shorten the raise time of the laser pulse, preferably without changing the peak power of the laser pulse. Advantageously, the laser output with the main laser pulse is shaped. The device for shaping the temporal intensity profile leaves the principal laser frequency of the pulse essentially unchanged. This device can be a part of the laser system itself or might be acting on laser pulses leaving the laser system before the interaction with the target takes place. In particular, the particle pulse is collimated featuring a small emittance or divergence.

Advantageously, the device yields an increase in the achievable energy of the accelerated particles, in particular electrons and protons. The laser pulse peak intensities in the interaction can be increased while the generation of a pre-plasma can be avoided. It is also possible to use targets which are thinner than targets necessary in the presence of a pedestal intensity.

In a preferred embodiment the device for shaping the temporal intensity profile is capable of reducing intensity in at least one of the wings of said pulse, especially in the raising wing or raising edge of said laser pulse, the wing comprising the accompanying pedestal intensity pulse. In other words, the device can include a non-linear filter or a non-linear attenuator device which reduces the pedestal power, especially while maintaining essentially unchanged the peak power of the laser pulse. In this advantageous manner the pedestal intensity is removed from the laser pulse before interaction with the target.

In an advantageous embodiment the device for shaping the temporal intensity profile exhibits an intensity-dependent transmission or an intensity-dependent reflection.

In concrete realisations of the device for generating a high-energy particle pulse the device for shaping the temporal intensity profile can comprise a plasma mirror, a non-linear Sagnac interferometer, a non-linear polarisation rotation device, a saturated-absorption filter or a fast Pockels cell, especially an optically switched fast Pockels cell.

A preferred laser system in the device according to the invention is a chirped pulse amplification (CPA) facility, in particular a double-CPA laser system, of a self mode-locked Ti:Sapphire laser with output energy greater than 0.6 J, output power greater than 20 TW, especially greater than 100 TW, and repetition rate greater than 5 Hz, especially equal to or greater than 10 Hz, capable of emitting laser pulses shorter than 40 fs (femtoseconds), especially shorter than 30 fs, in particular 25 fs.

The target can be a gas jet, or a thin water curtain, or a droplet jet, or a solid metal-doted plastic polymer. The target can be positioned in a vacuum chamber. In particular, the thickness of the target can be of the order of several microns, especially below 15 microns. A thin target permits to obtain strong electric fields which yield a powerful particle acceleration.

It is preferred in certain embodiments that the material, the shape and the dimensions of the target are chosen in such a way that the target is capable of releasing electrons with energy greater than or equal to 1 MeV. In particular, electrons with energies up to 1 GeV can be generated.

Alternatively it is preferred in certain embodiments that the laser contrast is greater than 10^6, especially the laser peak intensity is greater than 10^19 W/cm^2, and that the material, the shape and the dimensions of the target are chosen in such a way that the target is capable of releasing protons with energy greater than or equal to 1 MeV. In particular, protons with energies up to 400 MeV can be generated. The target can be a solid target only several microns thin.

For instance in view of possible applications in the medical or radiological field the device according to the invention can comprise a transform device for shaping said high-energy particle pulse. The transform device can comprise particle filters and/or magnets in order to modify the beam properties, such as the energy distribution, the propagation direction, the emittence, the divergence, the fluence or the angular distribution.

There is also provided a method for generating a high-energy particle pulse. In the method laser pulses with a pulse length shorter than 1 ps, preferred shorter than 100 fs, and capable to be focused to peak intensities greater than 10^18 W/cm^2, preferred greater than 10^20 W/cm^2, are produced. The temporal intensity profile accompanying said at least one of said laser pulses is shaped and the laser contrast is increased above 10^5, preferably above 10^7, especially 10^10. Then a target capable of releasing a high-energy particle pulse, particularly an electron pulse or a proton pulse, upon irradiation is irradiated with at least one of said shaped laser pulses.

In a preferred embodiment of the method according to the invention the at least one laser pulse is propagated to said target under vacuum condition. The interaction at the target itself takes place under vacuum condition, too. Both measures independently from each other reduce advantageously the risk of degradation of the laser pulses.

The device and method according to this specification provides high-energy particles which can broadly and advantageously be used in medical applications, radiological applications, radiobiological applications, radiochemical applications, or applications in physical engineering, especially in the physics of accelerators, or in material engineering.

Further improvements, refinements and advantageous embodiments, features and characteristics are described below and explained in more detail by referring to the attached drawings. It should be understood that the detailed description and specific examples given, while indicating the preferred embodiment, are intended for purpose of illustration and are not intended to unduly limit the scope of the present invention.

Figure 2:
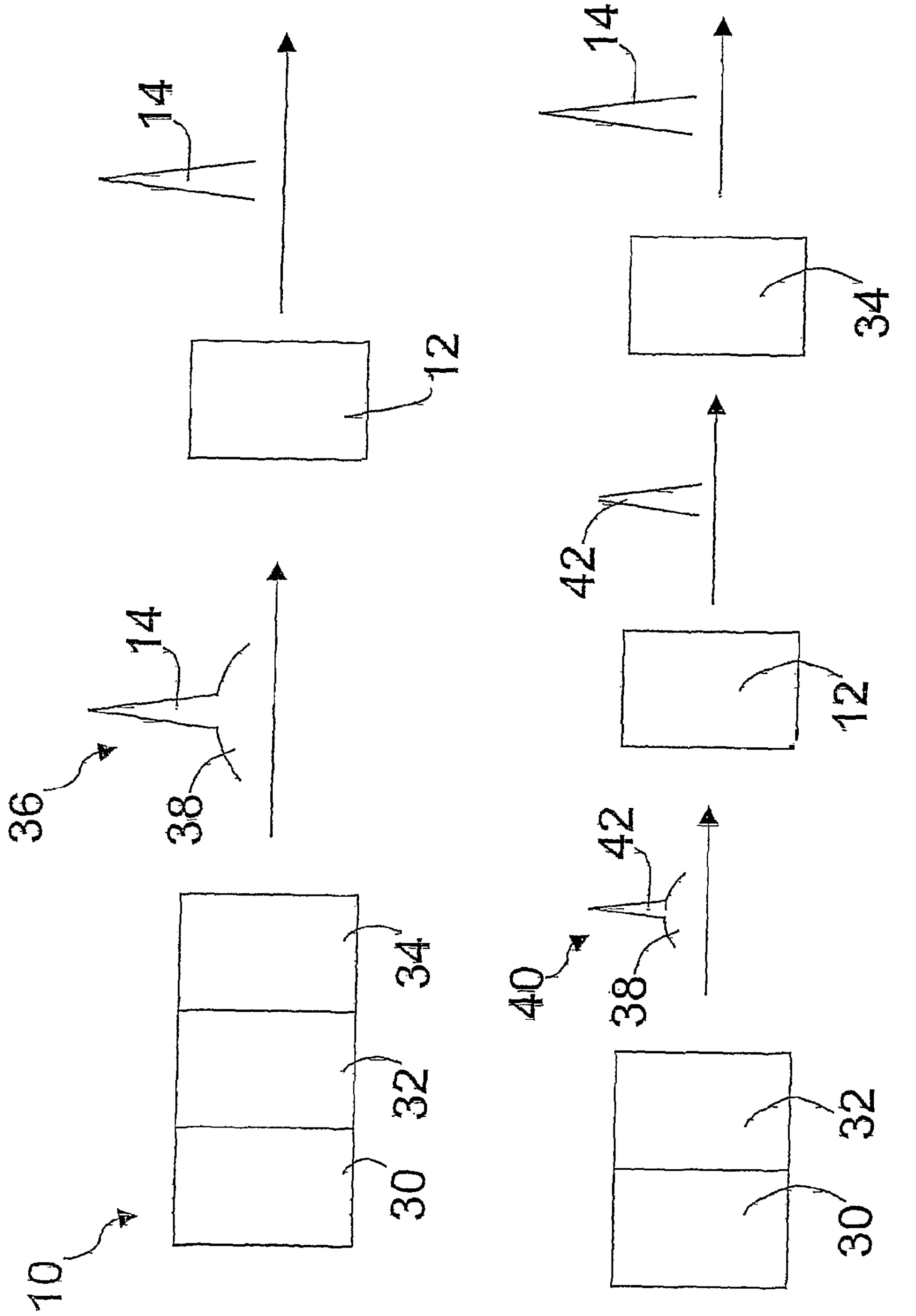
Figure 3:
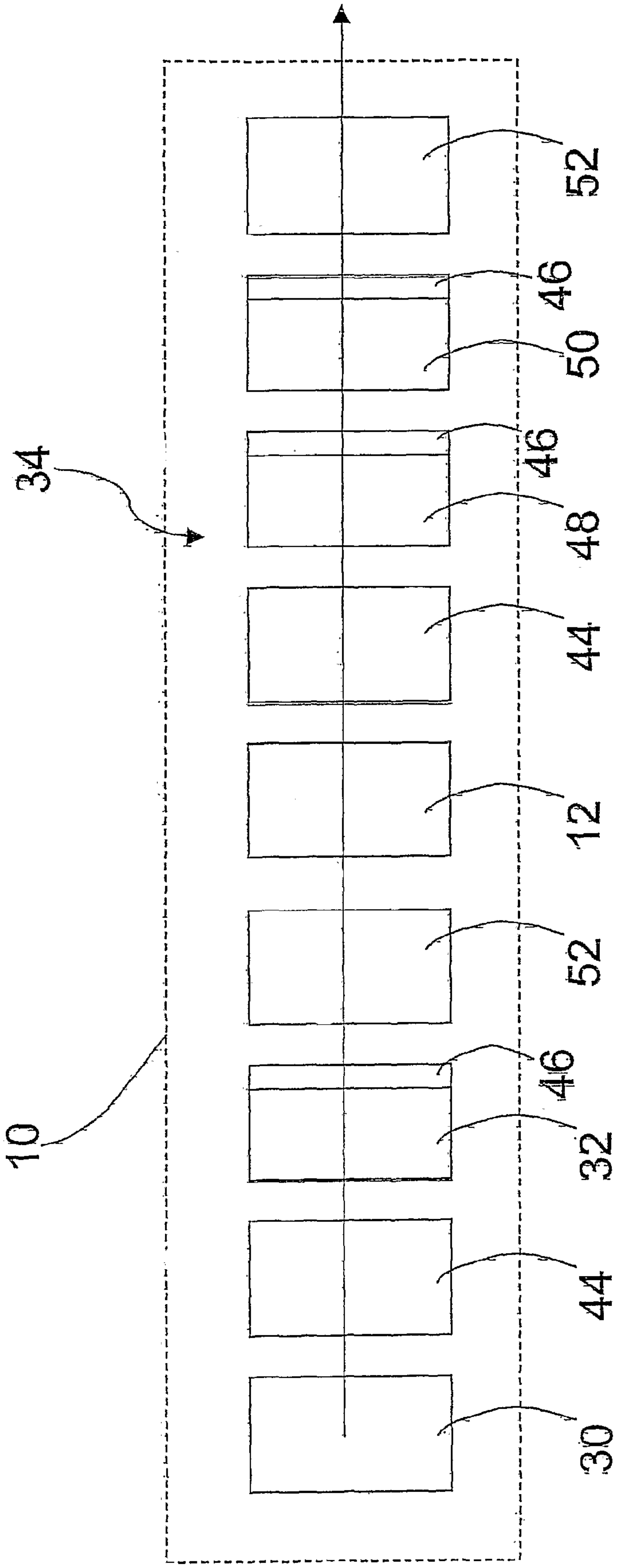
Figure 4:
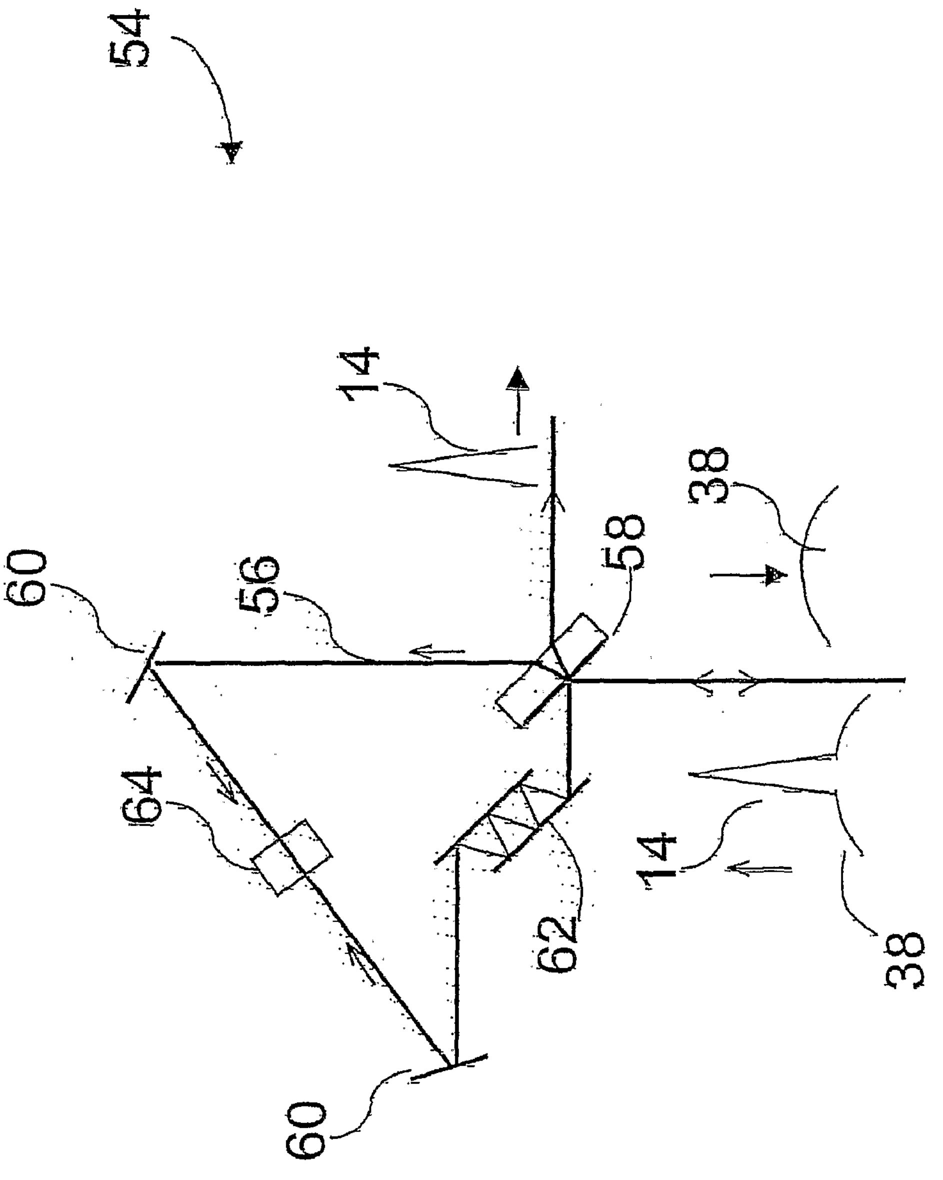
Figure 5:
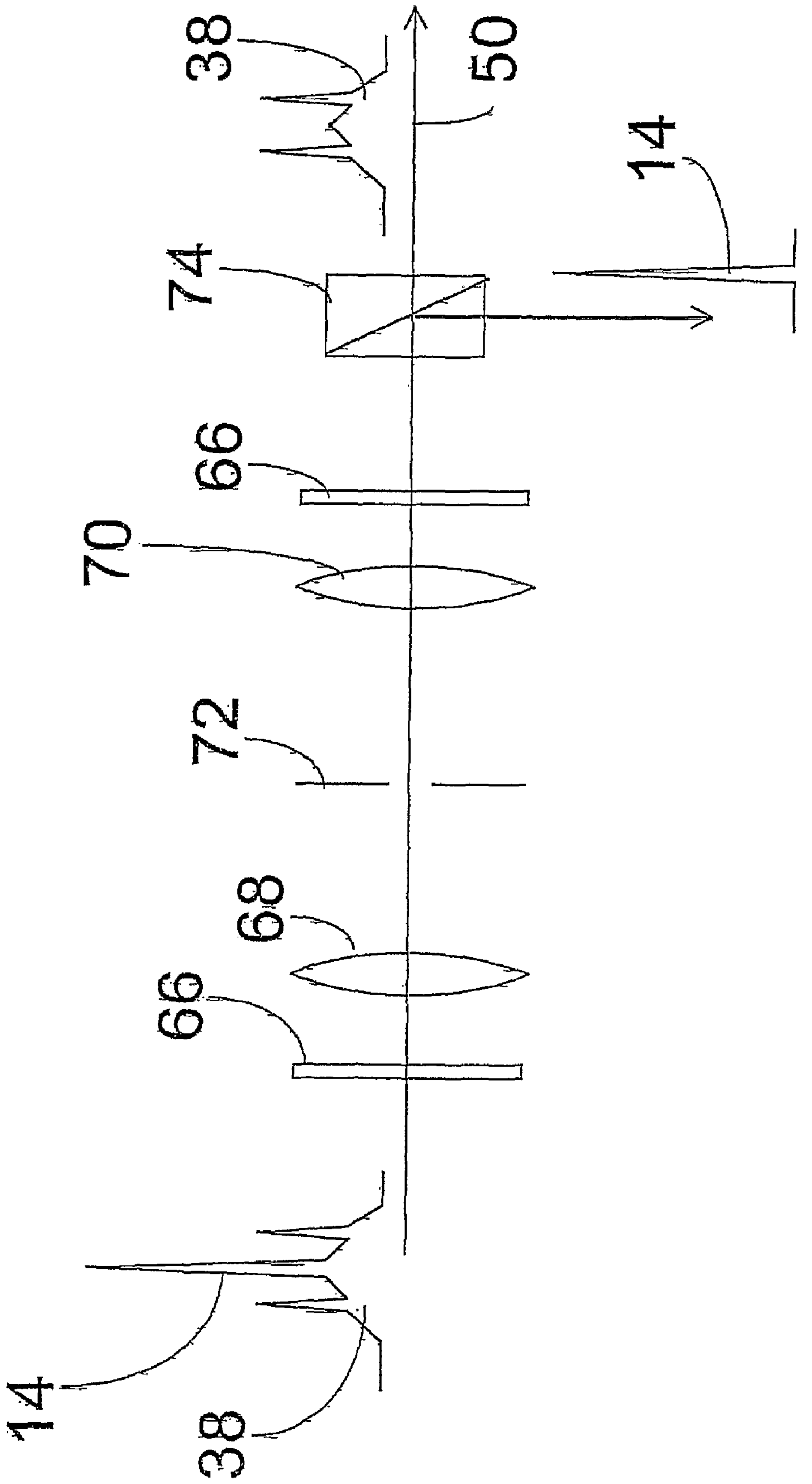
Figure 6:
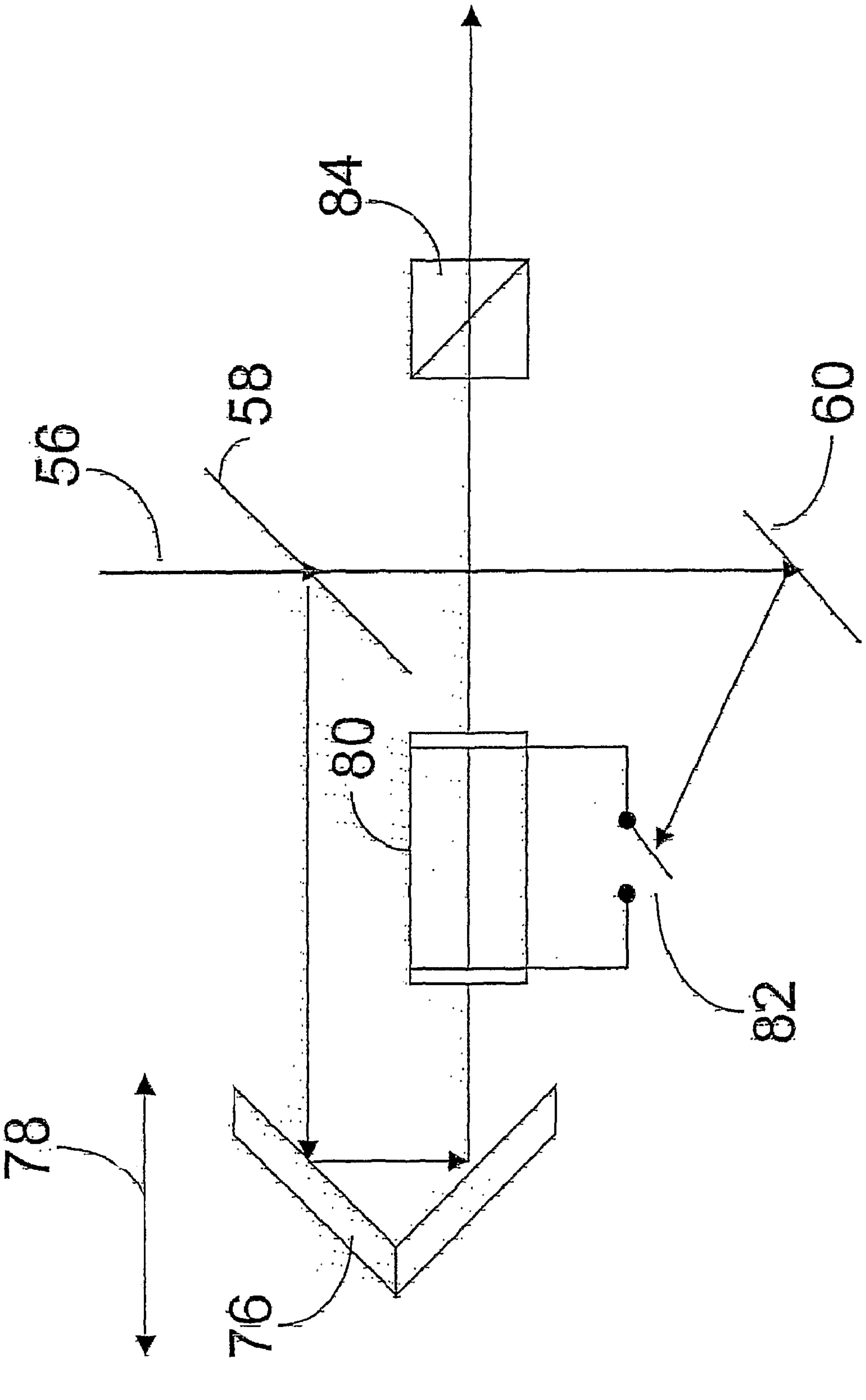
Figure 7:
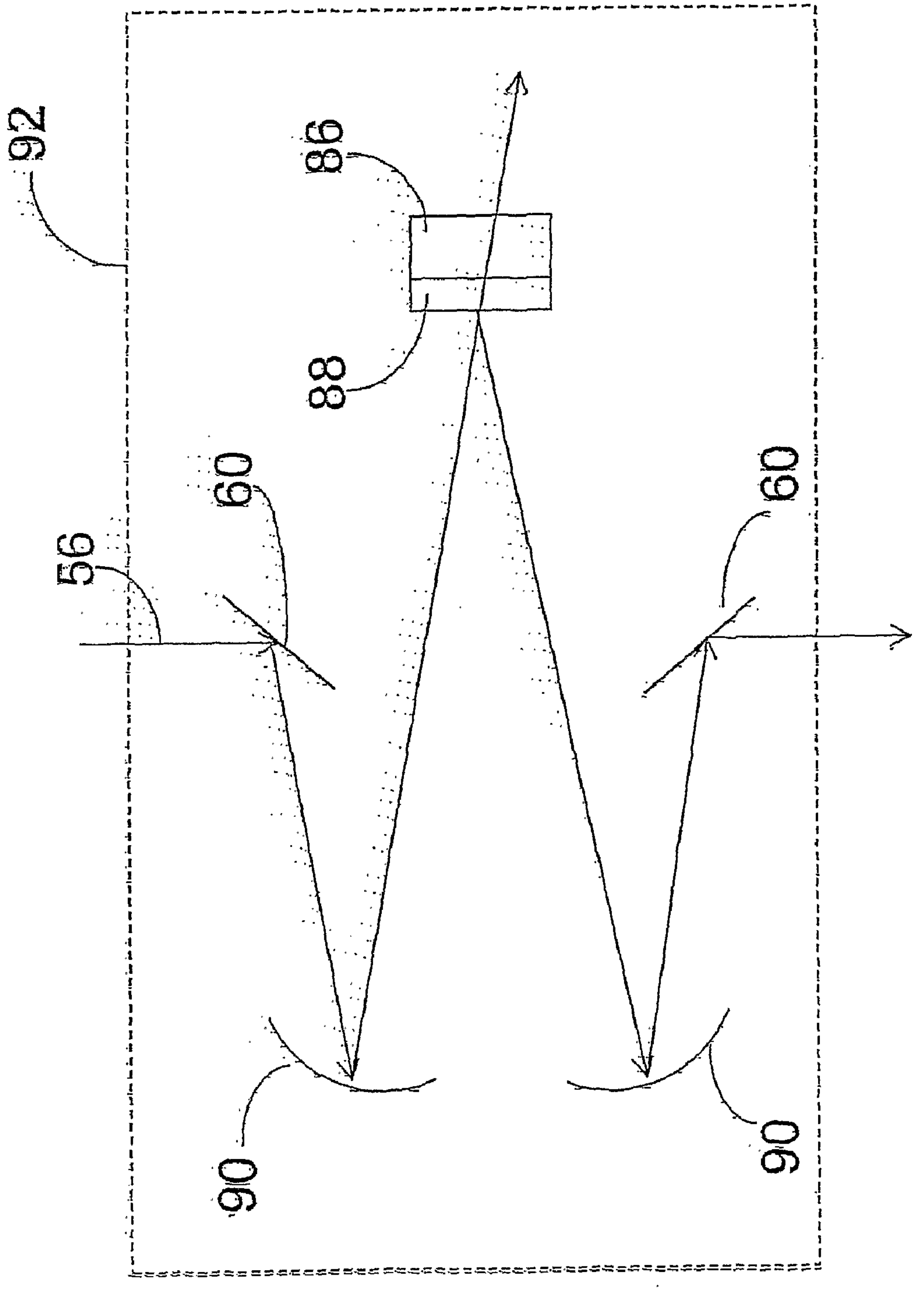

The various features, advantages and possible uses of the present invention will become more apparent in the following description and the attributed drawings, wherein:

FIG. 1 is showing a schematic representation of the topology of an embodiment of the device according to the invention, FIG. 2 is showing two possible arrangements how the device for shaping the temporal profile of the laser pulses can act together with the laser system, FIG. 3 is showing a scheme of the preferred embodiment of the chirped pulse amplification (CPA) laser facility used in the device according to the invention, FIG. 4 is serving to explain the principal construction of a non-linear Sagnac interferometer, FIG. 5 is representing a non-linear polarisation rotation device used in an embodiment of the device according to the invention, FIG. 6 is schematically showing an arrangement of a device for shaping the temporal profile of the laser pulses using a fast Pockels cell, and FIG. 7 is related to an embodiment of the device according to the invention using a plasma mirror as a device for shaping the temporal profile.

In FIG. 1 a schematic representation of the topology of a preferred embodiment of the device for generating a high-energy particle pulse is shown. A laser system 10 is capable of emitting a train of sub-picosecond ultra-intense laser pulses 14 which can be focused to peak intensities greater than 10^18 W/cm^2. The laser system 10 comprises a device 12 for shaping the temporal intensity profile of the laser emission or laser output. The laser output consists of sub-picosecond laser pulses 14 which have an advantageously steep rising edge (see also FIG. 2). Delivery optics 22 which may comprise light guiding elements, divergence or emittance converting elements or the like, represented here in FIG. 1 by a simple mirror, guide the laser pulses 14 to a reaction or interaction volume. The laser pulses are focused with the aid of a parabolic mirror 24 onto a target 16. The target 16 is preferably positioned in the focus or close to the focus, for instance in the Rayleigh range of the focus, of the laser pulses 14. The target 16 has surface layers 18 which may either be adsorbed hydrocarbons, e. g. proton-rich or Hydrogen-rich material, (a microscopic layer) or a layer received on the target 16 (a macroscopic layer) out of proton-rich material, for instance an organic polymer. The interaction of the laser pulses 14 with the target 16 yields a highly collimated (very low emittance) particle pulse 14 emitted essentially perpendicular to the rear surface of the target 16. The embodiment shown in FIG. 1 also comprises a transform device 26 which is capable to influence parameters such as the propagation direction, the energy distribution, the fluence, the divergence or the emittence, of the produced particle pulse 20 and to render a shaped particle pulse 28 which might be used in a medical or radiological application.

FIG. 2 is intended to serve in explaining how the device 12 for shaping the temporal profile of the laser pulses 14 can act together with the laser system 10 in two possible arrangements according to the invention. In the upper part of FIG. 2 a laser system 10 comprising an oscillator 30, a pre-amplifier 32 and a main amplifier 34 has a laser output 36 in the form of a sub-picosecond laser pulse 14 over a pedestal intensity 38. This pedestal intensity 38 can be removed or suppressed by a device 12 for shaping the temporal intensity profile. The result which is outputted by said device 12 is a clean sub-picosecond laser pulse 14 which features a steeply or sharply rising edge and which is usable in the invention. In the lower part of FIG. 2 an oscillator 30 and a pre-amplifier 32 work together so that a pre-amplified seed pulse 40 is generated. Such an amplification increases the pulse energy from the nanojoule to the millijoule level. The main contribution for the degradation of the laser contrast originates from the pre-amplification stage. A device 12 for shaping the temporal intensity profile transforms the pre-amplified seed pulse 40 into a sub-picosecond seed pulse 42 which afterwards is amplified by a main amplifier 34 to become a sub-picosecond laser pulse 14 usable in the invention.

In FIG. 3 a scheme of the preferred embodiment of the laser system used in the device according to the invention is shown. The laser system is a so-called double-CPA laser system. A mode-coupled oscillator 30 comprises a Titanium:Sapphire crystal which is pumped by an Argon-ion laser. The oscillator 30 output consists of femtosecond pulses, in particular essentially 15 fs long, with an energy of 2 nJ with a repetition rate of approximately 88 MHz. The oscillator 30 pulses are stretched by a pair of optical gratings in stretcher 44 (pulse chirping) and an acousto-optical modulator is used afterwards to select individual pulses at a frequency of 10 Hz out of the high-frequency pulse train leaving the oscillator 30 and the stretcher 44. After that pulses essentially 400 ps long and with an energy of about 500 pJ enter an 8-pass pre-amplifier 32. The pre-amplifier 32 is pumped by a frequency-doubled pulsed Nd:YAG laser with 200 mJ energy per pulse at a frequency of 10 Hz. Stretcher 44 and pre-amplifier 32 are optically isolated using an arrangement of a Pockels cell between polarizers. The output of pre-amplifier 32 passes through a spatial filter 46 (afocal ×4) and conveys an energy of 2 mJ per pulse. Now the 10 Hz pulse train is partially or totally recompressed (compressor 52, pulse dechirping) and passes a device 12 for shaping the temporal intensity profile (preferred topology after the pre-amplification stage). As already mentioned above it is advantageous to increase the laser contrast right after the pre-amplification stage. Several more concrete embodiments of such a device 12 are explained in detail below, referring also to the attached FIGS. 4 to 7. The device 12 is followed by a second stretcher 44 (pulse chirping) and by a main amplifier 34. The main amplifier 34 comprises a 5-pass first power amplifier 48 pumped by a frequency-doubled pulsed Nd:YAG laser with 1 J energy per pulse at 10 Hz. The pulses amplified to 200 mJ energy pass through a spatial filter 46, preferably a vacuum spatial filter (afocal ×4) and enter a 4-pass second power amplifier 50 of the main amplifier 34. The crystal of the second power amplifier 50 is contained in a cryogenic chamber at 120 K temperature. Several frequency-doubled pulsed Nd:YAG lasers pump this amplification stage: Three lasers at 1.7 J, three lasers at 1.5 J, an one laser at 1.7 J are used. This arrangement results in an output of pulses being 400 ps long and having an energy of 3.5 J. After the second amplification a spatial filter 46, preferably a vacuum spatial filter (afocal ×1) is traversed. The pulses are eventually compressed in a vacuum compressor 52 (pulse dechirping) using a pair of optical gratings reaching pulses being 25 fs long and having an energy of 2.5 J.

At this point it is worthwhile to note that a femtosecond pulse of an oscillator based on a Kerr-lens mode-locking technique exhibits a temporal pulse profile with a very high laser contrast, even up to 9 or 10 orders of magnitude. It is on the level of the different amplification stages that the spontaneous emission is amplified and a very high laser contrast is spoiled or degraded. Nevertheless, in order to reach laser pulse peak intensities for the described used in a device for generating a high-energy particle pulse a CPA laser system needs to be employed.

In addition, when a seed laser pulse from an oscillator is directly amplified to about 10 μJ, the amplified spontaneous emission (ASE) forming a pedestal intensity on the time scale of nanoseconds can be suppressed by a non-linear filter using a saturated absorber before the seed pulse is stretched (chirped) for further amplification.

FIG. 4 is devoted to explain the principal construction of a non-linear Sagnac interferometer 54 which is used as an advantageous embodiment of the device 12 for shaping the temporal intensity profile. The light is travelling on light path 56 through the interferometer 54 in a ring configuration. Light is guided by beam splitter 58 to enter the interferometer 54 in both direction of the light path 56 through the ring formed by mirrors 60. On its path 56 the light passes a pair of chirped mirrors 62 and a piece of an n2-material 64, e. g. a material with intensity-dependent optical refractive index. With this arrangement a non-linear, meaning an intensity-dependent response or transmission behaviour of the Sagnac interferometer can be achieved: Light consisting of a sub-picosecond pulse 14 on a pedestal intensity 38 will undergo an intensity-dependent reflection and transmission. Light at the intensity level of the pedestal intensity 38 will experience interference in the Sagnac ring interferometer 54 in such a way that a reflection of the pedestal intensity 38 occurs while light at the intensity level of a sub-picosecond pulse 14 capable of affecting the effective optical length of the interferometer 54 will experience interference in such a way that a transmission of the sub-picosecond pulse 14 occurs.

FIG. 5 is representing a non-linear polarisation rotation device used in an alternative advantageous embodiment of the device 12 for shaping the temporal intensity profile. An input temporal intensity profile comprising a sub-picosecond pulse and a pedestal intensity pass consecutively a first phase plate 66, a focusing lens 68, a pin hole 72 serving as a spatial filter device, a defocusing lens 74 and a second phase plate 66. This embodiment takes advantage of the induced non-linear birefringence in air: A polarizer 74 reveals that the sub-picosecond pulse 14 has obtained a linear polarization in a first direction while the pedestal intensity 38 has obtained a linear polarisation in a second direction, perpendicular to the first direction.

In FIG. 6 an arrangement of a device 12 for shaping the temporal profile of the laser pulses using a fast Pockels cell is schematically shown. Light travelling on light path 56 is separated into two parts by a beam splitter 58. A first part is reflected on a mirror 60 and hits a photoconductor 82 serving as a fast switch for a Pockels cell 80, an optically switched Pockels cell. The second part travels through an optical delay line 76 whose light path can be changed in translation direction 78. The light leaving the optical delay line 76 is coupled into the Pockels cell 80 and traverses the Pockels cell 80 under rotation of its polarisation direction if the fast switch is closed by the first part of the light impinging on the photoconductor 82. The reaction time of an optically-switched Pockels cell is of the order of 50 ps and a jitter is shorter than 2 ps. Such an arrangement can advantageously be used for shaping the temporal profile of a light pulse partially or totally recompressed: With a careful time correlation of the event when the first part of the light is closing the switch and the second light part is just arriving at the Pockels cell 80, the Pockels cell 80 can be activated or deactivated in such a way that the transmission through a polarizer 84 downstream from the Pockels cell 80 is blocked when only pedestal intensity is present but transmission through the polarizer 84 is possible when a certain intensity threshold is exceeded, for instance a sub-picosecond pulse is arriving.

FIG. 7 is related to an embodiment of the device according to the invention using a plasma mirror 86 as an alternative embodiment for a device 12 for shaping the temporal profile. The plasma mirror 86 basically consists of a transparent slab which exhibits at low light flux impinging on its surface an ordinary reflectivity (Fresnel-like) and which at high light flux suffers a breakdown and becomes a plasma and in consequence is having an increased reflectivity. With this embodiment an increase of the laser contrast can be reached by essentially the same factor as the reflectivity increases from the Fresnel to the plasma regime. The tighter the light is focused onto the plasma mirror 86, the temperature of the induced plasma will be larger and, hence, the reflectivity improves. The laser contrast can be increased even further when a plurality of plasma mirrors is used consecutively for a certain impinging light pulse with a temporal intensity profile. A practical and advantageous arrangement for using a plasma mirror 86 is shown in FIG. 7. Light is travelling on light path 56 via a mirror 66 onto an off-axis parabolic mirror 90 focusing the light onto a plasma mirror 86. The plasma mirror 86 is coated by an anti-reflection layer 88. When the plasma mirror 86 becomes a plasma due to breakdown light is reflected and is defocused by an off-axis parabolic mirror 90 and guided further by a second mirror 60. The arrangement is advantageously disposed in a vacuum chamber 92. Typical dimensions of such a setup are 5 m in length and 0.4 m in width.

REFERENCE NUMERAL LIST

10 laser system
12 device for shaping the temporal intensity profile
14 sub-picosecond laser pulse
16 target
18 surface layers
20 particle pulse
22 delivery optics
24 parabolic mirror
26 transform device
28 shaped particle pulse
30 oscillator
32 pre-amplifier
34 main amplifier
36 laser output
38 pedestal intensity
40 pre-amplified seed pulse
42 sub-picosecond seed pulse
44 stretcher
46 spatial filter
48 first power amplifier
50 second power amplifier
52 compressor
54 non-linear Sagnac interferometer
56 light path
58 beam splitter
60 mirror
62 pair of chirped mirrors
64 n2-material
66 phase plate
68 focusing lens
70 defocusing lens
72 pin hole
74 polarizer
76 optical delay line
78 translation direction
80 Pockels cell
82 photoconductor
84 polarizer
86 plasma mirror
88 anti-reflection layer
90 off-axis parabolic mirror
92 vacuum chamber

The invention claimed is:

1. A device for generating a high-energy particle pulse (20), comprising:

a laser system (10) producing laser pulses (14) with pulse length shorter than 100 fs and capable to be focused to peak intensities greater than 10ˆ18 W/cm 2;

a target (16) capable of releasing a high-energy particle pulse (20) upon irradiation with at least one of said laser pulses (14);

characterised by a device (12) for shaping a temporal intensity profile accompanying said at least one laser pulse (14) for increasing the laser contrast above 10ˆ5, said laser contrast being the ratio of a peak intensity to a pedestal intensity of said one laser pulse (14), the pedestal intensity being a precursor intensity on a raising edge of said one laser pulse (14) or a successor intensity on a falling edge of said one laser pulse (14), the device (12) for shaping the temporal intensity profile comprising a non-linear Sagnac interferometer (54) having a pair of chirped mirrors (62) and apiece of n2-material (64), a non-linear polarisation rotation device, a saturated-absorption filter or a Pockels cell (80) optically switched by a part of said one laser pulse (14) impinging on a photoconductor (82) serving as a fast switch for the Pockels cell (80).

2. A device for generating a high-energy particle pulse (20) according to claim 1, characterised in that the device (12) for shaping the temporal intensity profile is capable of reducing intensity in at least one of the wings of said pulse

3. A device for generating a high-energy particle pulse (20) according to claim 1, characterised in that the device (12) for shaping the temporal intensity profile exhibits an intensity-dependent transmission.

4. A device for generating a high-energy particle pulse (20) according to claim 1, characterised in that the laser system (10) is a chirped pulse amplification facility of a self mode-locked Ti:Sapphire laser with output energy greater than 0.6 J, output power greater than 20 TW and repetition rate greater than 5 Hz capable of emitting laser pulses shorter than 40 fs.

5. A device for generating a high-energy particle pulse (20) according to claim 1, characterised in that the target (16) is a gas jet, or a thin water curtain, or a droplet jet, or a solid metal-doted plastic polymer

6. A device for generating a high-energy particle pulse (20) according to claim 1, characterised in that the target (16) is capable of releasing electrons with energy greater or equal 1 MeV.

7. A device for generating a high-energy particle pulse (20) according to claim 1, characterised in that the laser contrast is greater than 10 6 and target (16) is capable of releasing protons with energy greater or equal 1 MeV.

8. A device for generating a high-energy particle pulse (20) according to claim 1, characterised by a transform device (26) for shaping said high-energy particle pulse.

9. A method for generating a high-energy particle pulse (20), comprising:

producing laser pulses (14) with a pulse length shorter than 100 fs and capable to be focused to peak intensities greater than 10ˆ18 W/cm 2;

irradiating a target (16) capable of releasing a high-energy particle pulse (20) upon irradiation with at least one of said laser pulses (14);

characterised by shaping a temporal intensity profile accompanying said at least one of said laser pulses (14) and increasing the laser contrast above 10ˆ5 before irradiation of said target (16), said laser contrast being the ratio of a peak intensity to a pedestal intensity of said one laser pulse (14), the pedestal intensity being a precursor intensity on a raising edge of said one laser pulse (14) or a successor intensity on a falling edge of said one laser pulse (14), by using a non-linear Sagnac interferometer (54) having a pair of chirped mirrors (62) and a piece of n2-material (64), a non-linear polarisation rotation device, a saturated-absorption filter or a Pockels cell (80) optically switched by a part of said one laser pulse (14) impinging on a photoconductor (82) serving as a fast switch for the Pockels cell (80).

10. The device of claim 1, wherein the part of said one laser pulse (14) impinging on the photoconductor (82) does not traverse the Pockels cell.

11. The method of claim 9, wherein the part of said one laser pulse (14) impinging on the photoconductor (82) does not traverse the Pockels cell.

* * * * *